(12) United States Patent
Federermann et al.

(10) Patent No.: US 8,531,058 B2
(45) Date of Patent: Sep. 10, 2013

(54) ELECTRICAL APPLIANCE

(75) Inventors: Marc Federmann, Sternenfels (DE); Martin Graw, Königsbach-Stein (DE); Volkmar Uebele, Bad Nauheim (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 985 days.

(21) Appl. No.: 12/598,205

(22) PCT Filed: Apr. 15, 2008

(86) PCT No.: PCT/EP2008/054523
§ 371 (c)(1), (2), (4) Date: Oct. 30, 2009

(87) PCT Pub. No.: WO2008/135344
PCT Pub. Date: Nov. 13, 2008

(65) Prior Publication Data
US 2010/0123357 A1    May 20, 2010

(30) Foreign Application Priority Data
May 4, 2007    (DE) .......................... 10 2007 021 065

(51) Int. Cl.
*H02J 7/00*    (2006.01)
*H02J 9/00*    (2006.01)

(52) U.S. Cl.
USPC ......................................................... 307/66

(58) Field of Classification Search
USPC ........................................ 307/66, 112, 116
See application file for complete search history.

(56) References Cited

U.S. PATENT DOCUMENTS

| | | |
|---|---|---|
| 5,642,004 A | 6/1997 | Bircher |
| 6,650,030 B2 * | 11/2003 | Has ................................ 307/140 |
| 2002/0085400 A1 | 7/2002 | Has |
| 2002/0118552 A1 * | 8/2002 | Nakagawa ..................... 363/20 |
| 2002/0138160 A1 * | 9/2002 | Klein et al. ..................... 700/21 |
| 2004/0160209 A1 * | 8/2004 | Emori et al. .................. 320/104 |
| 2009/0184584 A1 * | 7/2009 | Hermann et al. ............... 307/80 |

FOREIGN PATENT DOCUMENTS

| | | |
|---|---|---|
| DE | 19537600 A1 | 4/1997 |
| DE | 19652472 A1 | 6/1998 |
| DE | 20116719 U1 | 1/2002 |
| DE | 10148644 A1 | 4/2003 |
| JP | 10-248256 A | 9/1998 |

* cited by examiner

*Primary Examiner* — Rexford Barnie
*Assistant Examiner* — Toan Vu
(74) *Attorney, Agent, or Firm* — James E. Howard; Andre Pallapies

(57) ABSTRACT

A household appliance which includes an activation unit, a power supply unit, a switch that is operated by the activation unit, and a capacitor that is connected in parallel to the switch on the primary side of the power supply unit. The power supply unit is connected to a power supply network and supplies, on the secondary side of the power supply unit, power to controlled functional units of the household appliance and to the activation unit. The switch is operated by the activation unit to disconnect the power supply unit from the power supply network on the primary side of the power supply unit and in an idle state of the household appliance.

18 Claims, 1 Drawing Sheet

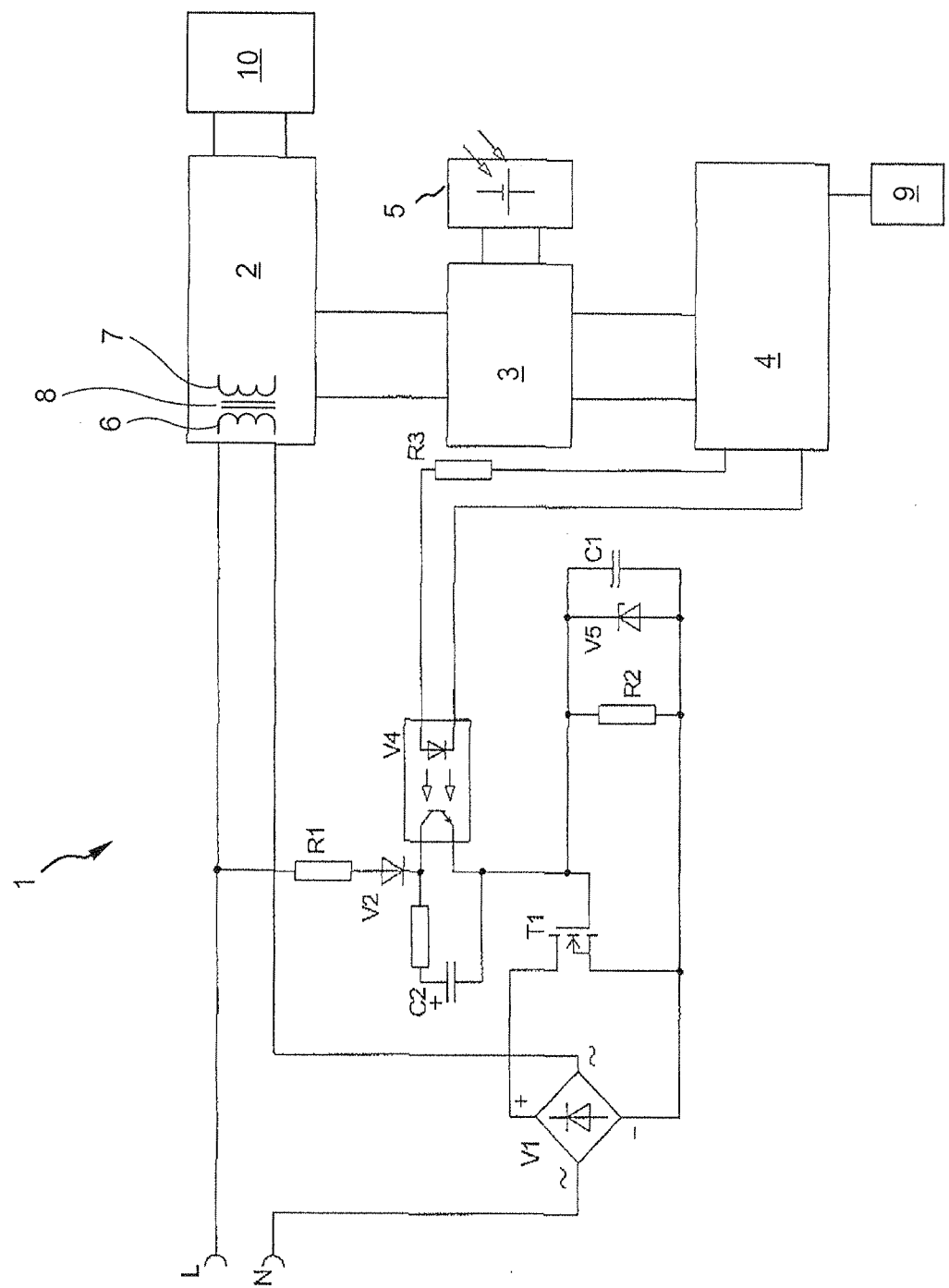

ELECTRICAL APPLIANCE

BACKGROUND OF THE INVENTION

The invention relates to an electrical appliance, especially a household appliance, comprising an activation unit and at least one power supply which is linked up to a power supply network for the secondary-side supply of controlled functional units of the electrical appliance and the activation unit, and with a switch which separates the power supply unit of the electrical appliance, in an idle state, from the power supply network on the primary side and can be switched on by the activation unit.

DE 101 48 644 A1 discloses an electrical circuit for dimming the two half waves of an alternating current with a rectifier full bridge which is connected with its alternating-current inputs via an inductive load lying in series to an alternating-current source and into the diagonals of the direct current outputs of which a field effect transistor is connected, whereby the control voltage applied between gate and source is formed by an optocoupler driven synchronously with the alternating current.

DE 195 376 00 A1 and DE 196 52 472 A1 disclose an electronic circuit for energy saving in alternating current transformers, in which a primary-side electronic switch e.g. a diac, interrupts a primary side circuit of the transformer and then closes it again (known as a Horstmann circuit).

DE 19932 453 A1 and WO 01/05132 A1 disclose an electric appliance comprising a power supply unit, a transformer power supply unit and a control card for an electric appliance. Disclosed therein is an electrical appliance with a control unit and at least one power supply unit which is linked up to a power supply network and used for the supply of controlled functional units and the control unit which is able to be connected via lines to a data network outside the device via which control signals, especially a call signal, can be sent to the control unit in order to start a data transmission from or to the electrical appliance. In order to implement an energy consumption of 0 in standby mode of the electrical appliance, the switch separates the power supply of the electrical appliance in the idle state from the power supply network and the polling signal with its energy closes the electrical switch. These documents thus show a Horstmann circuit switched by an external data line.

BRIEF SUMMARY OF THE INVENTION

The object of the present invention is to create a possibility for immediate secondary-side power supply of an electrical appliance that is self-blocking in standby mode, especially a household appliance, and a corresponding control unit after a power separation.

The electrical appliance is provided with an activation unit and at least one power supply unit which is linked up to a power supply network for secondary-side supply of functional units of the controlled electrical appliances and of the activation unit, and with a switch which separates the power supply unit of the electrical appliance in the idle (standby) state on the primary side from the power supply network and can be switched on by the activation unit. In this case the switch is connected on the primary side in parallel to a capacitor. Through this arrangement an immediate secondary-side activation (power on-reset) of the electrical appliance is able to be realized when the power supply network is switched on, e.g. via a mains switch or by plugging in a power cord. With a discharged capacitor this acts as a bridging of the switch, so that the power supply unit is then linked up to the power supply network (or to any other suitable power supply voltage) independently of the switch state of the switch.

The activation unit can be any element which is able to switch the switch. Preferably, to avoid additional components, this is the control unit that also controls the functional units of the electrical appliance, e.g. a microcontroller. For further power saving the activation unit can however also be a circuit specially provided for switching the switch such as an ASIC or a printed circuit for example, so that in standby mode the microcontroller can be switched off. The activation unit can however also be a switch itself, e.g. a pushbutton switch, which on actuation issues a voltage pulse sufficient for actuating the switch switching on the primary-side mains voltage, e.g. a piezoelectric switch located under a glass ceramic. It is advantageous for the electrical appliance to comprise a delay arrangement, which uses the initially short duration of the primary-side activation to keep the switch open or delay it until the switch is kept closed by a control arrangement in normal operation.

Preferably, to implement a simple arrangement, the switch separates the primary side and the secondary side metallically, Preferably the switch is an optocoupler. Alternatively however non-metallically separating switches are also able to be used, e.g. a transistor, in which case the switching arrangement should be designed so that faults between primary side and secondary side will be avoided.

Advantageously an energy store, e.g. an accumulator, a capacitor or a gold cap can be switched between the power supply and activation unit, in order in this way to achieve a 0 W standby power of the activation unit in a simple manner during a charged state of the energy store.

For charging-up the energy store this is advantageously coupled to an autonomous (i.e. not fed by a power supply network) power source, especially a solar cell unit.

Preferably the power supply network for the electrical appliance, especially an extractor hood, is able to be switched on and off externally by a user by means of a further functional unit, especially by means of a window switch or a hob/hood combination, with the further functional unit especially opening or closing a main switch upstream from the above electrical appliance for providing a main power supply voltage (typically but not necessarily a mains voltage). This embodiment is especially suitable for the embodiment equipped with the parallel-switched capacitor for power on-reset.

The power supply, especially an electromagnetic or electronic transformer, is equipped with an electrical switch for switching a mains voltage, with the switch separating the power supply in the standby state on the primary side from the power supply network. The switch is switched in parallel with a capacitor on the primary side, to allow a power on-reset.

In this case the switch advantageously separates the primary side and secondary side of the power supply metallically.

BRIEF DESCRIPTION OF THE DRAWINGS

The invention is advantageously described in greater detail schematically below with reference to an exemplary embodiment which is not to be understood as restricting the invention.

The FIGURE shows a diagram of a circuit arrangement for an electrical appliance.

DETAILED DESCRIPTION OF EXEMPLARY EMBODIMENTS OF THE PRESENT INVENTION

The FIGURE shows a circuit arrangement 1 for an electrical appliance, especially a household appliance such as an extractor hood. When the electrical appliance is in standby or idle mode the switch in the form of an optocoupler V4 is opened. This causes the gate connection G and the source connection S of the MOS-FET T1 to be at the same potential via a resistor R2 and the MOSFET T1 blocks. The power supply 2 is then separated on the primary side 6 from the power supply network. The secondary side 7 of the power supply network is coupled to a functional unit 10. This means that the secondary side 7 of a transformer 8 of the power supply 2 is also no longer supplied with power by the power supply, of which an accumulator connected downstream from the power supply as an energy store 3 and an activation unit 4 connected downstream from this in turn in the form of a microcontroller are shown in the diagram. The activation unit 4 switches the optocoupler V4. The energy consumption of the electronics or of the power supply is practically 0 in standby mode.

If the electrical appliance is now to be put into the normal operating state, the switch V4 is closed by the activation unit 4. This makes the voltage potential more positive at gate G in relation to source S and the FET T1 becomes conductive. Then the rectifier full bridge V1 with its ac inputs and the primary winding of the power supply 2, e.g. of an electrical or electronic transformer, are switched in series. The power supply 2 is now attached on the primary side to the power-supplying network L, N and the normal operating state is reached.

So that the activation unit 4 switches the optocoupler V4 and can poll the operating request from an additional function unit 9 via the control unit (not shown), the activation unit 4 or the microcontroller of the activation unit will be supplied in standby mode via the energy store 3. The microcontroller 4 is operated in this case in power-saving mode (e.g. so-called SLEEP mode) to consume as little energy as possible. So that sufficient power is available for operating the activation unit 4 and for switching the optocoupler V4, the energy store 3 will be charged while the power is disconnected via a solar cell 5 or the charge is maintained in standby mode. In addition the activation unit can monitor a charge state of the energy store 3 and, on reaching a predetermined threshold value, e.g. a minimum voltage value, can close the switch V4 (and thereby switch off standby mode) until such time as the energy store 3 is again sufficiently charged. The energy store 3 can also be charged in normal mode via the power supply 2.

The capacitor C2 connected in parallel to the optocoupler V4 on the primary side acts after a longer period of disconnection and restoration of mains power as a short circuit, so that when power is restored the low-voltage power supply is immediately available on the primary side on the power-supplying network L, N. The optocoupler V4 can be controlled by the automatic control system 4 and the energy store 3 can be charged.

This circuit enables a standby power consumption of practically 0 W to be achieved. In addition no external control voltage is necessary for activation or deactivation of the standby state.

The function and method of operation of the further elements depicted in the diagram will be clear to the person skilled in the art after reading the above description Thus a Zener diode V5 is provided in order to limit a voltage at the gate G of MOSFET T1. By means of the diode V2 it is ensured that only a rectified control voltage is present at MOSFET T1 The rectifier full bridge V1 is used for polarizing the MOSFET T1.

The above circuit arrangement is not limited to the embodiment or application shown; the basic principle can also be transferred to a Horstmann circuit for example. The circuit arrangement is basically also able to be used in switched-mode power supplies in other electrical appliances. Furthermore for example the optocoupler or the switching elements associated with it can be replaced by other metallically-isolating electrical or electronic switches. The activation unit can also be supplied with power via its own power supply.

LIST OF REFERENCE SYMBOLS

1. Circuit arrangement
2. Power supply
3. Energy store
4. Activation unit
5 Autonomous energy source
L Power supply network
N Power supply network
R Resistor
C Capacitor
T1 Field-effect transistor
V1 Rectifier full bridge
V2 Diode
V3 Zener diode
V4 Switch

The invention claimed is:

1. A household appliance, comprising:
an activation unit;
a power supply unit connected to a power supply network and to supply, on a secondary side of the power supply unit, power to controlled functional units of the household appliance and to the activation unit;
a switch operated by the activation unit, wherein the switch, while in a first mode, galvanically isolates the power supply unit from the power supply network on a primary side of the power supply unit and the switch, while in a second mode, continuously connects the primary side of the power supply unit to the power supply network, and wherein the switch is in the first mode at least while the household appliance is in an idle state; and
a capacitor connected in parallel to the switch on the primary side of the power supply unit.

2. The household appliance of claim 1, wherein the switch galvanically separates the primary side of the power supply unit from the secondary side of the power supply unit.

3. The household appliance of claim 2, wherein the switch comprises an optocoupler.

4. The household appliance of claim 1, further comprising an energy store connected between the power supply unit and the activation unit.

5. The household appliance of claim 4, further comprising an autonomous power supply coupled to the energy store to charge the energy store.

6. The household appliance of claim 5, wherein the autonomous power supply comprises a solar cell unit.

7. The household appliance of claim 1, further comprising an additional functional unit that is operated by a user to externally switch on or switch off the power supply network for the household appliance.

8. The household appliance of claim 7, wherein the household appliance comprises an extractor hood.

9. The household appliance of claim 7, wherein the additional functional unit is selected from the group consisting of a window switch, a range/hood combination, and a remote control.

10. A power supply unit of a household appliance, the power supply unit comprising:

an electrical switch to switch a main voltage of a power supply network, wherein the electrical switch, while in a first mode, galvanically isolates the power supply unit from the power supply network on a primary side of the power supply unit at least while the household appliance is in an idle state, and wherein the electrical switch while in the first mode galvanically separates the primary side of the power supply unit from a secondary side of the power supply unit and the switch, while in a second mode, continuously connects the primary side of the power supply unit to the power supply network.

11. The power supply unit of claim 10, wherein the power supply unit comprises a transformer.

12. The power supply unit of claim 10, further comprising a capacitor connected in parallel to the electrical switch on the primary side of the power supply unit.

13. A household appliance, comprising:
a power supply unit having a primary side and a secondary side, the power supply unit to supply power to the household appliance on the secondary side of the power supply unit;
an activator to operate a switch wherein the operation of the switch places the switch in a first mode or a second mode;
in the first mode, the switch galvanically isolates the power supply unit on the primary side from an external power supply network and the switch is in the first mode at least while the household appliance is in an idle state;
in the second mode, the switch continuously connects the primary side of the power supply unit to the power supply network; and
a capacitor in parallel to the switch on the primary side of the power supply unit.

14. A system comprising:
a power supply unit of a household appliance, the power supply unit having a primary side and a secondary side;
a power supply network to supply power to the power supply unit;
a switch operating in a first mode during which the switch galvanically isolates the power supply unit from the power supply network on the primary side, wherein the switch is in the first mode at least while the household appliance is in an idle state, and the switch while in the first mode galvanically separates the primary side from the secondary side of the power supply unit, and the switch operates in a second mode during which the switch continuously connects the primary side of the power supply unit to the power supply network, and
a capacitor in parallel to the switch on the primary side of the power supply unit.

15. A power supply unit for a household appliance comprising:
a transformer having a primary configured to connect to a power supply network and a secondary configured to connect to the household appliance;
a switch connected to the primary, wherein the switch in a first mode galvanically isolates the primary of the power supply unit from the power supply network, and the switch in a second mode causes the primary to be continuously galvanically connected to the power supply network; and
a capacitor connected in parallel to the switch and connected to the primary side.

16. The power supply unit of claim 15 further comprising a transistor switch controlled by the switch, and a diode bridge configured to connect in series between the primary and the power supply network, wherein the transistor switch is connected across direct current terminals of the diode bridge and the transistor switch being opened to open the bridge and disconnect the primary from the power supply network when the switch is in the first mode and the transistor switch being closed to conductively close the bridge such that the primary is galvanically connected to the power supply network when the switch is in the second mode.

17. A power supply unit for a household appliance comprising:
a transformer having a primary configured to connect to a power supply network and a secondary configured to connect to the household appliance;
a control switch connected to the primary, wherein the switch in a first mode galvanically isolates the primary from the power supply network, and the switch in a second mode causes the primary to be galvanically connected to the power supply network;
a diode bridge having alternating current terminals and direct current terminals, the alternating current terminals are connect in series between the primary and the power supply network,
a transistor switch is connected in series across the direct current terminals of the diode bridge, wherein the transistor switch is controlled by the control switch such that the transistor switch creates an open circuit across the direct current terminals while the control switch is in the first mode and creates a short circuit across the direct current terminals when the switch is in the second mode.

18. The power supply unit of claim 17 further comprising a capacitor connected in parallel with the control switch.

* * * * *

UNITED STATES PATENT AND TRADEMARK OFFICE
CERTIFICATE OF CORRECTION

PATENT NO.      : 8,531,058 B2  
APPLICATION NO. : 12/598205  
DATED           : September 10, 2013  
INVENTOR(S)     : Federmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this
Fifteenth Day of September, 2015

Michelle K. Lee
*Director of the United States Patent and Trademark Office*